United States Patent [19]
Eddy-Helenek et al.

[11] Patent Number: 5,817,183
[45] Date of Patent: Oct. 6, 1998

[54] METHOD FOR REMOVING COATINGS FROM THERMOPLASTIC SUBSTRATES

[75] Inventors: Victoria Jean Eddy-Helenek, Scotia; Amy Kathleen Simonian, Clifton Park, both of N.Y.

[73] Assignee: General Electric Company, Schenectady, N.Y.

[21] Appl. No.: 695,468

[22] Filed: Aug. 12, 1996

[51] Int. Cl.⁶ .................... B05B 7/00; B05B 3/00
[52] U.S. Cl. ................... 134/19; 134/26; 134/27; 134/28; 134/36
[58] Field of Search ................ 134/19, 26, 27, 134/28, 36

[56] References Cited

U.S. PATENT DOCUMENTS

| | | | |
|---|---|---|---|
| 4,027,073 | 5/1977 | Clark | 428/412 |
| 4,323,597 | 4/1982 | Olson | 427/160 |
| 4,332,455 | 6/1982 | Stettner | 354/324 |
| 4,455,205 | 6/1984 | Olson et al. | 204/159 |
| 4,624,870 | 11/1986 | Anthony | 427/387 |
| 5,041,313 | 8/1991 | Patel | 427/379 |
| 5,151,452 | 9/1992 | Fennhoff et al. | 521/48 |
| 5,306,349 | 4/1994 | Nee | 134/1 |
| 5,340,839 | 8/1994 | Gillette et al. | 521/40 |
| 5,414,021 | 5/1995 | Eddy | 521/48 |
| 5,580,819 | 12/1996 | Li et al. | 427/167 |

OTHER PUBLICATIONS

"Photocrosslinking of Silicones. VI.* Photocrosslinking Kinetics of Silicone Acrylates and Methacrylates" Uwe Muller; Steffen Jockusch, Hans–Joachium Timpe; Journal of Polymer Science: Part A: Polymer Chemistry, vol. 30, 2755–2764 (1992).

*Primary Examiner*—Marian C. Knode
*Assistant Examiner*—Brenda G. Brumback
*Attorney, Agent, or Firm*—Noreen C. Johnson; Douglas E. Stoner

[57] ABSTRACT

A method is provided for salvaging thermoplastic substrates from discarded coated thermoplastic articles which have been surface treated with a protective or decorative organic coating. The discarded coated thermoplastic substrates, such as polycarbonate substrates, can be granulated, treated with an aqueous caustic-surfactant solution which contains an anionic, nonionic or mixture thereof surfactant, and where the treated thermoplastic substrates are thereafter washed until a neutral pH of the wash rinse-off solution is achieved.

14 Claims, No Drawings

METHOD FOR REMOVING COATINGS FROM THERMOPLASTIC SUBSTRATES

FIELD OF THE INVENTION

The present invention relates to a method for recycling thermoplastic substrates which have been surface treated with protective or decorative coatings. More particularly, the present invention relates to a method for effecting the removal of organic, organosilicon, lacquers, dyes, or metal-containing coatings from thermoplastic articles such as discarded compact discs, lenses for spectacles or for other optical applications, or lamp or headlight reflectors.

BACKGROUND OF THE INVENTION

Thermoplastic substrates are often used in glazing applications. Shaped thermoplastic substrates may employ a protective coating to preserve optical clarity and impact resistance. Thermoplastics often use a protective coating to avoid scratch marks and to minimize environmental degradations particularly if the thermoplastic substrate, such as a polycarbonate article, is used in outdoor applications.

One procedure used in treating a thermoplastic substrate, such as polycarbonate sheet, can involve the use of a silicone hardcoat where the polycarbonate sheet is dipped into the hardcoat formulation, dried, and thermally or ultraviolet light cured. Additional protective coatings commonly used on polycarbonate articles are acrylic hardcoats and hardcoats based on formaldehyde-melamine resins. Other thermoplastics, such as a polymethylmethacrylate sheet can be initially treated with a thermoset acrylic primer followed by the application of a silicone hardcoat. Polycarbonates used for compact discs are often metallized with aluminum and surface-sealed with lacquers.

Thermoplastic end users and manufacturers such as found in the polycarbonate industry, have been faced with environmental concerns due to the build-up of discarded surface treated thermoplastic articles because they cannot be recycled. The thermoplastic substrates are often disposed of by landfilling which can create environmental concerns. Thus, there is a need to remove the surface coatings from the thermoplastic articles so that the thermoplastic substrates can be salvaged.

Several studies have been made with respect to the removal of protective or decorative coatings from thermoplastics such as polycarbonates. Some of the procedures which have been used include mechanical methods such as sandblasting or with pressurized $CO_2$. These methods have been shown to be environmentally and economically unattractive.

Chemical means for removing coatings from thermoplastics include U.S. Pat. No. 5,340,839, where a method is described for removing silicone hardcoats from polycarbonate substrates utilizing a 50% aqueous caustic solution in combination with isopropanol. A method for removing cured polyurethane paint from the surface of polycarbonate blend surfaces is disclosed in U.S. Pat. No. 5,414,021, which uses an aqueous bath containing an organic solvent, an alkali metal hydroxide and an anionic surfactant, preferably mono or di $C_{(10)}$ alkylated diphenyl ether disulfonates. These methods are environmentally unattractive and pose a fire hazard due to the alcohol content at the temperature operation required for the removal of the coatings.

A method for removing lacquer and aluminum coatings is patented by Sony Music Entertainment, Inc. in U.S. Pat. No. 5,306,349. This requires an alkaline solution with a chelating agent and a wetting agent with the application of heat and ultrasonic energy.

There is a need for a method to safely remove coatings from thermoplastic substrates without the presence of alcohol and without the added expense of ultrasonic energy and chelating agents. As a result, this invention addresses this need.

SUMMARY OF THE INVENTION

A method is described for salvaging thermoplastic substrates, such as consumer products molded from polycarbonate resins, by the safe and economic removal of coatings from the surfaces of the thermoplastic substrates, where the coatings include organic coatings, organosilicon coatings, metal-containing coatings, lacquers, dyes, or mixtures thereof. The present invention is based on the discovery that removal of protective and decorative coatings from the surface of thermoplastic substrates can be effected with an aqueous caustic solution that is agitated at an elevated temperature in the range of about 60°–100° C.; additionally, an effective amount of an anionic, non-ionic, or mixture of anionic and non-ionic surfactant is used in the coating removal caustic solution. The aqueous alkaline-surfactant solution treatment can be for a period of less than an hour to several hours.

Accordingly, the present invention relates to a method for the purification of waste of thermoplastic substrates, such as thermoplastic aromatic polycarbonates and thermoplastic aromatic polyester carbonates, which accumulate in the production of optical moldings, such as for example compact discs, lenses for spectacles or for other optical applications, or lamp or headlight reflectors.

It has also been found that the coated thermoplastic articles can be crushed or ground into granules or flakes prior to treatment with the aqueous alkaline-surfactant solution. The means of granulating the thermoplastic articles is known to those skilled in the art.

After treating the thermoplastic articles or thermoplastic granules in the aqueous coating removal caustic-surfactant solution, the treated thermoplastic substrates can be neutralized by rinsing with water, preferably de-ionized, followed by a dilute acidic rinse (1 weight % sulfuric acid), then rinsed with de-ionized water to a neutral pH, and dried to produce a substantially restored or reconstituted thermoplastic substrate without the coating.

DESCRIPTION OF THE INVENTION

There is provided by the present invention, a method for salvaging a thermoplastic substrate from a discarded thermoplastic substrate which has been treated with a decorative or protective coating comprising: treating the discarded thermoplastic substrate in a coating removal solution at a temperature of about 60° C. to about 100° C. with agitation and at a pH of about 10 to about 14 for a period of time sufficient to substantially remove the coating from the discarded thermoplastic substrate; removing a treated thermoplastic substrate from the coating removal solution; rinsing the treated thermoplastic substrate with a first aqueous rinse solution, followed by a dilute acidic aqueous rinse solution, and followed with a second aqueous rinse solution until the pH of the resulting runoff rinse solution is neutral; and drying the resulting rinsed thermoplastic substrate, where the coating removal solution comprises by weight about 40 to 95% water, about 5 to 60% of an alkaline material, and about 0.01 to 20% of a surfactant.

Discarded thermoplastic substrates which can be surface treated in accordance with the method of the present invention are polycarbonate substrates, such as silicone hardcoat composites, shown by Patel, U.S. Pat. No. 5,041,313 and Olsen, U.S. Pat. No. 4,455,205 incorporated herein by reference. For example, a polycarbonate substrate can be initially primed with an acrylic primer followed by treatment with a silicone hardcoat composition, such as shown by Clark, U.S. Pat. No. 4,027,073 incorporated herein by reference, or another variation of a colloidal silica filled silicone composition as shown by U.S. Pat. No. 4,624,870 incorporated herein by reference.

Additional discarded polycarbonate articles that have been surface treated with an organic material and which can be treated in accordance with the method of the present invention are polycarbonate sheets treated with a formaldehyde-melamine resin (FMR), or acrylic material such as a polymethylmethacrylate. Discarded thermoplastic substrates surface impregnated with organic ultraviolet radiation absorbers or stabilizers which can be salvaged in accordance with the practice of the invention are shown by Olson, U.S. Pat. Nos. 4,332,455 and 4,323,597, incorporated herein by reference.

Still other polycarbonate articles which can be salvaged include materials formed from the phosgenation or transesterification of aromatic bisphenols, such as 2,2-bis-(2-hydroxyphenyl)propane.

Additional polycarbonate substrates which can be salvaged can be made from aromatic bisphenols such as, 2,4'-dihydroxybiphenylmethane, bis-(2-hydroxyphenyl) methane, 2,2-bis-(4-hydroxyphenyl)propane, referred to hereinafter as "bisphenol A" or "BPA", 1,1-bis(4-hydroxyphenyl)ethane, 1,1-bis(4-hydroxyphenyl)propane, 4,4'-dihydroxybiphenyl, 4,4'-dihydroxy-3,3'5,5'-tetramethylbiphenyl, 2,4-dihydroxybenzophenone, 4,4', dihydroxybiphenyl sulfone, 2,4'-dihydroxydiphenyl sulfone, 4,4'-dihydroxydiphenyl sulfoxide, 4,4'-dihydroxydiphenyl sulfide, tetramethylbisphenol A, 1,1-dichloro-2,2-bis(4-hydroxyphenyl)ethylene, 6,6'-dihydroxy -3,3,3',3'-tetramethylbis(1,1-spiroindane)(spirobiindane bisphenol),

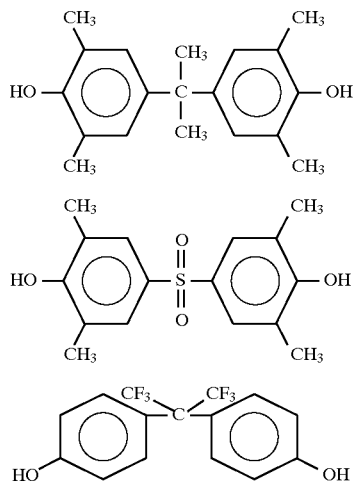

Copolycarbonates containing the above bisphenols as the major bisphenol constituents are also included. Also included are bisphenol-A polyester carbonate)s in which the bisphenol-A carbonate moieties are the major constituents.

In addition to discarded polycarbonate substrates, additional discarded thermoplastic substrates having a protective or decorative coating also can be treated in accordance with the practice of the invention, such as polymethylmethacrylates having a Mn of from about $10 \times 10^3$ to $500 \times 10^3$. There are also included discarded thermoplastic substrates having a protective or decorative coating, such as polyphenylene ethers, blends of polyphenylene ethers, aromatic polyester resins, polystyrenes, and ABS resins.

Other additives may be present in the above-mentioned thermoplastic substrates, such as pigments, flame retardants, and foaming agents. Reinforcing materials, such as powders, whiskers, fibers or platelets of metals, (i.e., aluminum, bronze, iron, or nickel), and non-metals, (i.e., carbon filaments, acicular $CaSiO_3$ asbestos, $TiO_2$, titanate whiskers, glass flakes and the like can also be present. There can also be present stabilizers, such as phosphites, phosphates, epoxides, hindered phenols, and the like, either in combination or individually, depending on the end use.

Aromatic polyester carbonates in the context of the present invention are those synthesized from at least one aromatic bisphenol, from at least one aromatic dicarboxylic acid and from carbonic acid. Suitable bisphenols are those mentioned above. Suitable aromatic dicarboxylic acids are, for example, orthophthalic acid, terephthalic acid, isophthalic acid, tert.butyl isophthalic acid, 3,3'-diphenyl ether, dicarboxylic acid, 4,4'-diphenyl dicarboxylic acid, 4,4'-diphenyl ether dicarboxylic acid, 4,4'-benzophenone dicarboxylic acid, 3,4'-benzophenone dicarboxylic acid, 4,4'-diphenylsulphone dicarboxylic acid, 2,2-bis-(4-carboxy phenyl)-propane, trimethyl-3-phenylindane-4,5'-dicarboxylic acid.

The aromatic polyester carbonates may be produced by methods of the type known from the literature for the production of polycarbonates, for example by processes in homogeneous solution, by melt transesterification processes and by the two-phase interfacial process.

The coatings which can be removed by the method of the present invention include organic coatings, organosilicone coatings, acrylates, dyes, lacquers, and metal-containing coatings.

Lacquers which may be removed from the polymer in accordance with the present invention are, for example, lacquers based on polyacrylonitrile, polyacrylate, polymethacrylate, polyvinylchloride, polysiloxane, or melamine resin.

Dyes suitable for the salvaging the thermoplastic substrate salvaging process according to this invention are, for example, dyes based on naphthaquinones, benzoquinones, anthraquinones, and azo compounds and also organic pigments and inorganic pigments.

In the process of this invention, the discarded coated thermoplastic substrate, which preferably means a polycarbonate substrate, (for example: a sheet, a headlamp, compact disc, or other molded article) had been treated with a decorative or protective coating, such as a silicone hard coat, a formaldehyde-melamine resin, an acrylic coating, or a metal-containing coating such as aluminum. Preferably, prior to contact with the aqueous coating removal caustic-surfactant solution, the coated thermoplastic substrate can be granulated using a conventional grinder to produce a particulated material. If desired, however, the intact coated thermoplastic substrate can be directly immersed in an agitated aqueous coating removal caustic-surfactant solution.

Alkali and alkaline earth hydroxides which can be used in the coating removal bath to achieve an effective pH of about 10–14 include hydroxides of alkaline metals, such as, lithium, cesium, rhodium, calcium, sodium and potassium, and hydroxides of ammonium or tetraalklyammonium for example, tetramethylammonium and tetrabutylammonium. These alkaline materials can be used in the form of aqueous solutions at a concentration of about 5–60% by weight and preferably 5–15% by weight.

Surfactants which can be used are anionic, non-ionic and mixtures thereof. The surfactant can be used in the aqueous alkaline solution at a concentration of about 0.01 to 20% by weight. A preferred anionic surfactant is Dowfax 8390 of the Dow Chemical Company, Midland, Mich. Another example of an anionic surfactant is Dowfax 3B2, a product of Dow Chemical, which is a C-10 monoalkylated disulfonated, diphenyl ether. Examples of nonionic surfactants are Iconol TDA-6 and Plurafac LF 131, products of BASF Corp. An example of a mixture of nonionic and anionic surfactants would be the use of the anionic surfactant Dowfax 8390 with the nonionic surfactant Iconol TDA-6. Also, combinations of surfactants can be used with two or more nonionic surfactants and an anionic surfactant, such as nonionic surfactant Plurafac LF 131, nonionic surfactant Iconol TDA-6, and anionic surfactant Dowfax 8390.

The anionic surfactants are generally based on alkylated diphenyl ether sulfonates. They are typically low foaming and are readily biodegraded. The anionic surfactants vary in length of alkyl chain, and whether one or both phenyl rings are alkalylated and/or sulfonated.

Table I is a list of surfactants that are used alone or in combination with another surfactant in the caustic coating removal bath of this invention.

TABLE 1

Surfactants In a Caustic Coating Removal Solution

| Surfactant | Structure | Cloud Point (°C.) | HLB | Endcapped | Available | Ionic nature |
|---|---|---|---|---|---|---|
| Dowfax 3B2$_1$ ® | C10 linear MADS | <F.P. | N/A | — | yes | anionic |
| Atlas G ® - 3886$_2$ | POE fatty alcohol, methyl ether | 10% soln.~35 | 9.4 | yes | yes, as G4848 | nonionic |
| Plurafac LF$_3$ ® 1200 | Alkoxylated Alcohol | 29.0 | 5.0 | no | yes | nonionic |
| Iconol TDA-6$_4$ ® | Alkoxylated Alcohol | <0 | 11.0 | no | yes | nonionic |
| Dowfax 8390$_5$ ® | C16, DADS high molecular weight | <F.P. | N/A | — | yes | anionic |
| BRIJ (R) 35$_6$® solution | POE Lauryl Ether | N/A | 16.9 | yes | yes | nonionic |
| Klearfac AA-$_7$ ® 270 | Phosphate Ester of PO alkylated fatty Acid | >100 | N/A | — | yes | anionic |
| Iconol DA-4$_8$ ® | Alkoxylated Alcohol | | | no | yes | nonionic |
| Dowfax C10L$_9$ ® | C10 MADS higher charge density than 3B2 | <F.P. | N/A | — | Yes | anionic |
| XU 40492.25$_{10}$ | C16 MADS | <F.P. | N/A | — | no | anionic |
| XU 40492.75$_{11}$ | C16 DADS | <F.P. | N/A | — | no | anionic |
| XU 40492.25 | C16 DAMS | <F.P. | N/A | — | no | anionic |
| XU 40492.00$_{12}$ | C16 MAMS | <F.P. | N/A | — | no | anionic |
| Plurafac LF ® 131$_{13}$ | Alcohol Alkoxylate | <0 | 4.0 | yes | yes | nonionic |

$_1$Trademark of Dow Chemical
$_2$Trademark of ICI
$_3$Trademark of BASF
$_4$Trademark of BASF
$_5$Trademark of Dow Chemical
$_6$Trademark of ICI
$_7$Trademark of BASF
$_8$Trademark of BASF
$_9$Trademark of Dow Chemical
$_{10}$Experimental Surfactant of Dow Chemical
$_{11}$Experimental Surfactant of Dow Chemical
$_{12}$Experimental Surfactant of Dow Chemical
$_{13}$Trademark of BASF
Key:
F.P.-Freezing point
N/A-Not applicable or not available
MADS-monoalkylated disulfonated diphenyl ether
DADS-dialkylated disulfonated diphenyl ether
MAMS-monoalkylated monosulfonated diphenyl ether
DAMS-dialkylated monosulfonated diphenyl ether Effective coating removal results can be achieved by the method of this invention if the coated thermoplastic substrate is exposed to the alkaline coating removal bath for a period of at least 5 minutes to about 6 hours employing agitation such as by stirring or rotating a perforated drum containing the thermoplastic substrate in the coating removal solution. A bath temperature in the range of about 600° to 100° C. can be used, and preferably about 70°–95° C.

After the coatings have been stripped from the thermoplastic substrates, the stripped thermoplastic substrates are removed from the aqueous alkaline solution. The stripped thermoplastic substrates are then washed with water, such as deionized water, followed by a dilute acidic rinse (1 weight % sulfuric acid), followed by a second deionized water rinse to remove remnant caustic solution from the thermoplastic substrates. The rinsing takes place until the rinse run-off solution is at a pH of about 7. Following washing, the thermoplastic substrates are dried in a suitable hot air dryer, such as the hot air dryer HAD, manufactured and sold by Branson Ultrasonic Corp., Danbury, Conn. The time required for rinsing and drying the thermoplastic substrates is about 15 minutes.

In order that those skilled in the art will be better able to practice this invention, the following examples are given by way of illustration and not by way of limitation. All parts are by weight.

EXAMPLE 1

In a typical experiment, a 300 milliliter three necked flask equipped with a condenser, nitrogen inlet, heating mantle, thermometer with Thermowatch temperature controller, and an overhead stirrer, was charged with 50 grams of 50 weight % aqueous caustic (sodium hydroxide), 100 milliliters of de-ionized water, and 5.6 grams of commercially available Dowfax 8390 surfactant solution (typically a 35–45% active surfactant), which is a 16 carbon alkyl chain length dialkylated and disulfonated diphenylether. The temperature of the caustic solution was about 90° C. when 50 grams of ground coated compact discs were added, and the temperature was then raised to 100° C. Samples of the compact disc (polycarbonate resin) were removed after 2, 4, and 6 hours at 95° C. The polymer samples were rinsed thoroughly with water and with dilute sulfuric acid, and then again with water until the decanted rinse water was at a pH of about 7. The compact disc samples were then dried in a vacuum oven at 120° C. for 1 hour.

In order to further evaluate the success of the coating removal process of this invention, 10 grams of each sample of cleaned compact discs were dissolved in 50 milliliters of methylene chloride and the solutions were examined under ultraviolet light (266 nm) to look at residual hardcoat fragments. A two hour sample solution showed the presence of some residual hardcoats but the 4 hour and 6 hour samples resulted in clear solutions without the presence of residual hardcoats, indicating complete coating removal had occurred.

EXAMPLE 2

A 300 milliliter three necked flask equipped with a heating mantle, a condenser, overhead stirrer and thermometer with a Thermowatch temperature controller was charged with 114.9 grams of de-ionized water, 50 grams of 50 weight % sodium hydroxide and 1% by weight of nonionic surfactant Iconol TDA-6. The solution was agitated and heated to 95° C. When the solution was at 95° C., 50 grams of compact disc material (polycarbonate resin) was added. After 1.5 hours at near reflux conditions, the compact disc material was rinsed, neutralized with 1% sulfuric acid and rinsed again to pH 7. The sample was then dried for 1 hour in a 115° C. vacuum oven. A methylene chloride solution of the treated material did not show the presence of a residual hardcoatings when subjected to ultraviolet light.

EXAMPLE 3

A 300 milliliter three neck flask equipped with a heating mantle, a condenser, overhead stirrer and thermometer with a Thermowatch temperature controller was charged with 99.96 grams of de-ionized water, 50 grams of 50 weight % sodium hydroxide, and 16.7 grams of anionic surfactant XU 40492.25 (C-16 monalkylated disulfonated diphenyl ether 10% active ingredients in solution) to obtain a 1 weight % treating surfactant solution. The solution was agitated and heated to 95° C. When the solution was 95° C., 50 grams of compact disc material was added. After 6 hours at near reflux conditions, the compact disc material was rinsed, neutralized with 1% sulfuric acid and rinsed again to pH 7. The sample was then dried for 1 hour in a 115° C. vacuum oven. A methylene chloride solution of the treated material did not show the presence of residual hardcoat when subjected to ultraviolet light.

EXAMPLE 4

A 300 milliliter three neck flask equipped with a heating mantle, a condenser, overhead stirrer and thermometer with a Thermowatch temperature control was charged with 114.9 grams of deionized water, 50 grams of 50 weight % sodium hydroxide and 0.17 grams of nonionic surfactant Plurafac LF 131 (0.1% by weight) and 2.16 grams of 35% active anionic surfactant Dowfax 8390 (1.3% by weight). The solution was agitated and heated to 70° C. When the solution was 70° C., 50 grams of compact disc material (polycarbonate resin) was added. After 0.5 hours, the compact disc material was rinsed, neutralized with 1% sulfuric acid and rinsed again to pH 7. The sample was then dried for 1 hour in a 115° C vacuum oven. A methylene chloride solution of the treated material did not show the presence of residual hardcoat when subjected to ultraviolet light.

EXAMPLE 5

A ten-gallon Brighton Reactor equipped with stirring and temperature controlling features was charged with 16.2 kilograms of de-ionized water, 3 kilograms of sodium hydroxide pellets (15 weight percent) and 26 grams of non-ionic Plurafac LF 131 (0.1% by weight in the treating coating removal solution) and 260 grams of 35 weight % active anionic surfactant Dowfax 8390 (1.3% by weight in the treating coating removal solution) and 500 grams of non-ionic surfactant Iconol TDA-6 (2.5% by weight in the treating coating removal solution). The solution was agitated and heated to 70° C. When the solution was at 70° C., 6 kilograms of coated, compact disc material was added. After 1.5 hours the compact disc material was rinsed, neutralized with 1% sulfuric acid and rinsed again to pH 7. The sample was then dried for one hour in a 115° C. vacuum oven. A methylene chloride solution of the treated material did not show the presence of residual hardcoat coating when subjected to ultraviolet light.

Table 2 summarizes various surfactant-caustic solutions that were used to remove coatings from polycarbonate resin. The types of coatings removed were aluminum, lacquers, acrylics, solvent or UV cured silicone hardcoats. The caustic used generally was an alkaline metal hydroxide, such as sodium hydroxide, however, alkaline metal phosphates and alkaline metal carbonates may also be utilized to achieve a pH between 10 and 14 of the caustic solution. Further, mixtures of alkaline salts or bases may be used to achieve the pH between 10 and 14 where the salts are selected from the group consisting of alkaline metal phosphates, alkaline metal hydroxides, and alkaline metal carbonates.

TABLE 2

SURFACTANT SYSTEMS

| | Caustic* | Surfactant Conc. | Temp. | Time | Types of Coating Removed |
|---|---|---|---|---|---|
| Anionic | pH 10–14 | 1%– | 95° C. | 6 Hr. | aluminum, lacquers, acrylics on CD's, sheet metal., solvents or UV cured silicone hardcoats |
| Nonionic | pH 10–14 | 1% | 95° C. | 1.5 Hr. | aluminum, lacquers, acrylics on CD's, sheet metal., solvents or UV cured silicone hardcoats |
| Anionic/nonionic | pH 10–14 | Anionic 1% Nonionic 0.1% | 70° C. | 30 min– 6 Hrs. | aluminum, lacquers, acrylics on CD's, sheet metal., solvents or UV cured silicone hardcoats |
| 2 Nonionics/1 anionic | pH 10–14 | Nonionic 0.1% Anionic 1% Nonionic 12.5% | 70° C. | 1.5 Hrs. | aluminum, lacquers, acrylics on CD's, sheet metal., solvents or UV cured silicone hardcoats |

*Caustic
Alkaline Salt or base including:
Alkali metal phosphates
Alkali carbonates
Alkali metal hydroxides

What is claimed:

1. A method for salvaging a thermoplastic substrate from a discarded thermoplastic substrate which has been treated with a decorative or protective coating comprising:

(1) treating the discarded thermoplastic substrate in a coating removal solution consisting of by weight about 40–95% water, about 5–60% of an alkaline material, and about 0.01–20% of a surfactant at a temperature between about 60° C. to about 100° C. with agitation and at a pH of about 10 to about 14 for a period of time sufficient to substantially remove the coating from the discarded thermoplastic substrate;

(2) removing a treated thermoplastic substrate from the coating removal solution;

(3) rinsing the treated thermoplastic substrate with a first aqueous rinse solution, followed by a dilute acidic aqueous rinse solution, and followed with a second aqueous rinse solution until the pH of the resulting runoff rinse solution is neutral; and (4) drying the resulting rinsed thermoplastic substrate.

2. A method in accordance with claim 1 where the discarded thermoplastic substrate is granulated.

3. A method in accordance with claim 1 where the discarded thermoplastic substrate is selected from the group consisting of polycarbonate substrates, polymethylmethacrylates, polyphenylene ethers, blends of polyphenylene ethers, aromatic polyester resins, polystyrenes, ABS resins, and mixtures thereof.

4. A method in accordance with claim 1 where sodium hydroxide is used to maintain the pH of the coating removal solution between the pH of about 10 to about 14.

5. A method in accordance with claim 1 where the alkaline material used to maintain the pH of the coating removal solution is selected from the group consisting of alkali metal phosphates, alkali metal hydroxides, alkali metal carbonates, and mixtures thereof.

6. A method in accordance with claim 1 where the surfactant is an anionic surfactant, a nonionic surfactant, or mixtures thereof.

7. A method in accordance with claim 6 where the anionic surfactant is a dialkylated and disulfonated diphenyl ether or a monoalkylated disulfonated diphenyl ether.

8. A method in accordance with claim 1 where the nonionic surfactant is an ethoxylated alcohol.

9. A method in accordance with claim 1 where the thermoplastic substrates are salvaged from thermoplastic substrate surfaces treated with an organo silicon hardcoat.

10. A method in accordance with claim 1 where thermoplastic substrates are salvaged from thermoplastic substrate surfaces treated with an organic coating.

11. A method in accordance with claim 10 where thermoplastic substrates are salvaged from thermoplastic substrate surfaces treated with a member selected from the class consisting of an acrylic coating and a formaldehyde melamine resin.

12. A method in accordance with claim 1 where the thermoplastic substrates are salvaged from thermoplastic substrate surfaces impregnated with an organic UV stabilizer.

13. A method in accordance with claim 1 where the thermoplastic substrates are recovered from discarded coated thermoplastic substrates used as compact discs.

14. A method in accordance with claim 13 where the discarded compact discs are surface treated with an aluminum coating and a organic coating.

* * * * *